(12) United States Patent
Kandler et al.

(10) Patent No.: US 10,206,231 B1
(45) Date of Patent: Feb. 12, 2019

(54) TIRE PRESSURE MONITORING SYSTEM (TPMS) MODULE, SYSTEM AND METHOD OF ACKNOWLEDGING DATA TRANSMISSIONS FOR TPMS

(71) Applicant: Infineon Technologies AG, Neubiberg (DE)

(72) Inventors: Michael Kandler, Sauerlach (DE); Wolfgang Scheibenzuber, München (DE); Maximilian Werner, Fischach (DE)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 15/877,740

(22) Filed: Jan. 23, 2018

(51) Int. Cl.
*B60C 23/04* (2006.01)
*H04W 4/80* (2018.01)
*H04B 1/3822* (2015.01)
*H04W 76/10* (2018.01)
*H04L 1/08* (2006.01)

(52) U.S. Cl.
CPC ......... *H04W 76/10* (2018.02); *B60C 23/0422* (2013.01); *H04B 1/3822* (2013.01); *H04L 1/08* (2013.01); *H04W 4/80* (2018.02)

(58) Field of Classification Search
CPC ..... B06C 23/00; B06C 23/02; B06C 23/0422; H04W 4/80; H04B 1/3822
See application file for complete search history.

(56) References Cited

U.S. PATENT DOCUMENTS

| | | | | |
|---|---|---|---|---|
| 6,825,758 | B1* | 11/2004 | Laitsaari | B60C 23/0433 116/34 R |
| 9,649,896 | B1* | 5/2017 | Lin | B60C 23/0464 |
| 2006/0220814 | A1* | 10/2006 | Kawashima | B29C 73/22 340/442 |
| 2006/0220815 | A1* | 10/2006 | Thomas | B60C 23/0416 340/447 |
| 2009/0102636 | A1* | 4/2009 | Tranchina | B60C 23/0408 340/447 |
| 2010/0207753 | A1* | 8/2010 | Sugiura | B60C 23/0408 340/447 |
| 2014/0188348 | A1* | 7/2014 | Gautama | B60W 10/30 701/48 |
| 2016/0375732 | A1* | 12/2016 | Lazar, II | G01P 7/00 73/115.08 |
| 2017/0080762 | A1* | 3/2017 | Guinart | B60C 23/20 |

* cited by examiner

*Primary Examiner* — Simon Nguyen
(74) *Attorney, Agent, or Firm* — Design IP

(57) ABSTRACT

A tire pressure monitoring system (TPMS) and TPMS sensor module are provide. The TPMS sensor module includes a pressure sensor configured to measure an internal air pressure of a tire and generate tire pressure information, a microcontroller unit electrically connected to the pressure sensor, and a transceiver electrically connected to the microcontroller unit, the transceiver configured to transmit a message including the pressure information, further configured to receive an acknowledgement in response to the transmitted message. Where, on a condition that the transceiver receives the acknowledgement, the microcontroller unit is configured to set the transceiver into a standby mode, and, where, on a condition that the transceiver does not receive the acknowledgement, the microcontroller unit is configured to instruct the transceiver to transmit a redundant message that is redundant to the transmitted message, and the transceiver is configured to transmit the redundant message.

20 Claims, 5 Drawing Sheets

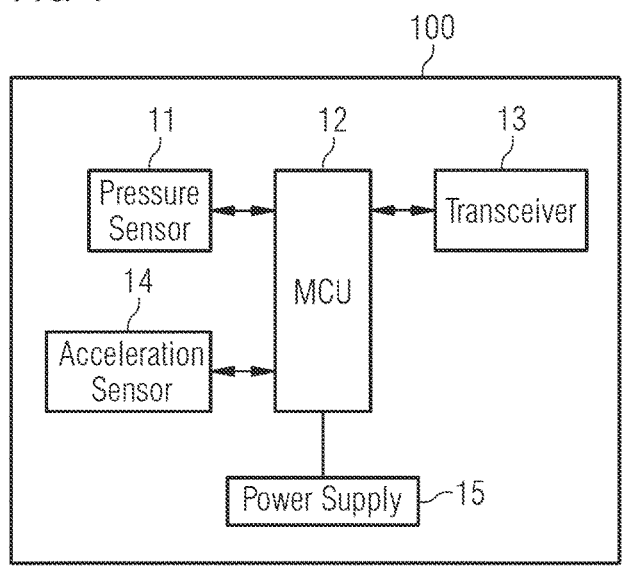

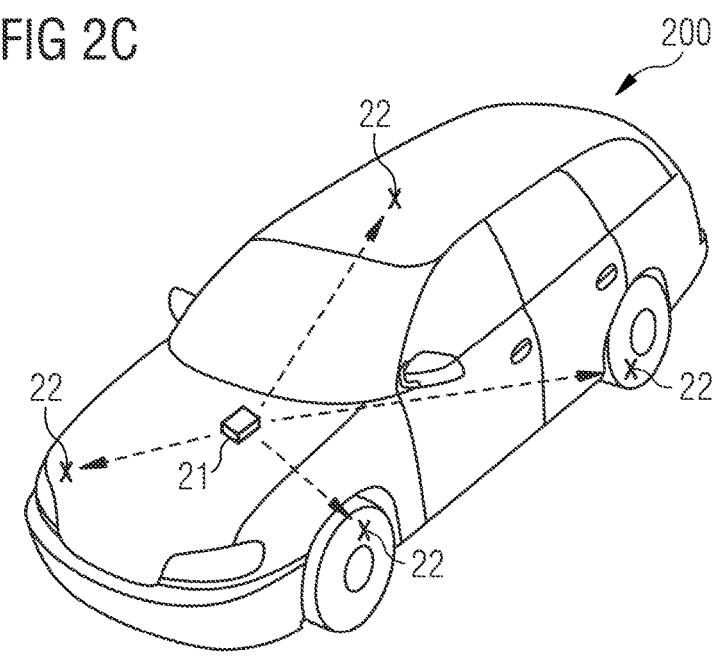

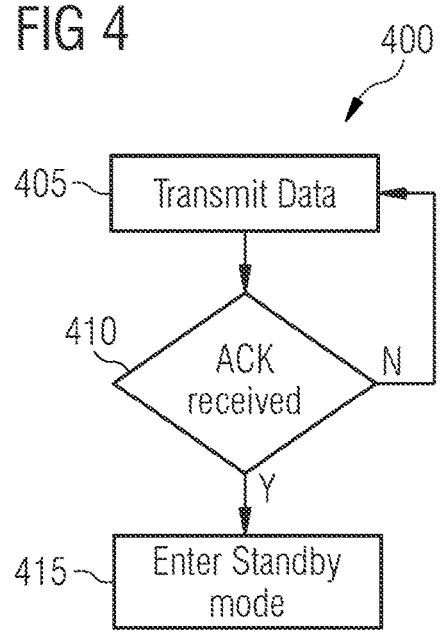

TIRE PRESSURE MONITORING SYSTEM (TPMS) MODULE, SYSTEM AND METHOD OF ACKNOWLEDGING DATA TRANSMISSIONS FOR TPMS

FIELD

The present disclosure relates generally to a tire pressure monitoring system (TPMS) and, more particularly, to acknowledging data transmissions in a TPMS.

BACKGROUND

Tire Pressure Monitoring Systems (TPMS) play an important role in vehicle safety and emissions reduction. A majority of this market is served by direct tire pressure monitoring systems, in which each tire contains a TPMS sensor module. Thus, a battery powered sensor module is assembled in the inside of a tire to monitor a tire pressure thereof. The sensor module contains a pressure sensor, a microcontroller, a radio-frequency (RF) transmitter and a coin battery cell. Principally, the sensor module measures the tire pressure and uses a unidirectional link to transmit the measurement data to a central unit in the vehicle. Since battery cannot be changed, sensor module lifetime is determined by battery lifetime. A major portion of the power consumption is generated by the RF transmission. Hence, it is an important task to reduce power consumption for RF transmission as much as possible.

For reducing power consumption of RF transmission two strategies exist: (1) choose a transmission interval as long as possible depending on situation (e.g., transmit every 10 minutes in parking but every 10 seconds while driving), or (2) only transmit when a change of pressure has been detected. The main problem with these strategies is the unidirectional link between tire module and vehicle control unit. In this case, the sensor module does not receive any feedback whether the transmitted data have been received or not. This is solved by transmitting data redundantly, e.g., repeating the telegram two or more times spaced by fixed and/or random pauses, without knowing whether a transmission has succeeded. The redundant transmissions increase power consumption considerably.

Therefore, an improved sensor module capable of reducing power consumption may be desirable.

SUMMARY

Embodiments provide apparatuses, methods and systems for acknowledging transmissions in a Tire Pressure Monitoring Systems (TPMS).

According to an embodiment, a TPMS sensor module includes a pressure sensor configured to measure an internal air pressure of a tire and generate tire pressure information; a microcontroller unit electrically connected to the pressure sensor; and a transceiver electrically connected to the microcontroller unit, the transceiver configured to transmit a message including the pressure information, further configured to receive an acknowledgement in response to the transmitted message. On a condition that the transceiver receives the acknowledgement, the microcontroller unit is configured to set the transceiver into a standby mode, and, on a condition that the transceiver does not receive the acknowledgement, the microcontroller unit is configured to instruct the transceiver to transmit a redundant message that is redundant to the transmitted message, and the transceiver is configured to transmit the redundant message.

According to another embodiment, TPMS includes a TPMS sensor module including a first transceiver configured to transmit a message including tire pressure information; and a vehicle control unit including a second transceiver configured to receive the message, and further configured to transmit an acknowledgement in response to the received message. On a condition that the first transceiver receives the acknowledgement, the TPMS sensor module is configured to set the first transceiver into a standby mode, and, on a condition that the first transceiver does not receive the acknowledgement, the TPMS sensor module is configured to instruct the first transceiver to transmit a redundant message that is redundant to the transmitted message, and the first transceiver is configured to transmit the redundant message to the vehicle control unit.

BRIEF DESCRIPTION OF THE DRAWINGS

Embodiments are described herein making reference to the appended drawings.

FIG. 1 illustrates a monolithic TPMS sensor module according to one or more embodiments;

FIGS. 2A-2C illustrate a TPMS provided in a vehicle according to one or more embodiments;

FIG. 4 is a flow diagram of a method implemented in a TPMS operating in a Bluetooth advertising mode according to one or more embodiments.

DETAILED DESCRIPTION

Figure 2A:
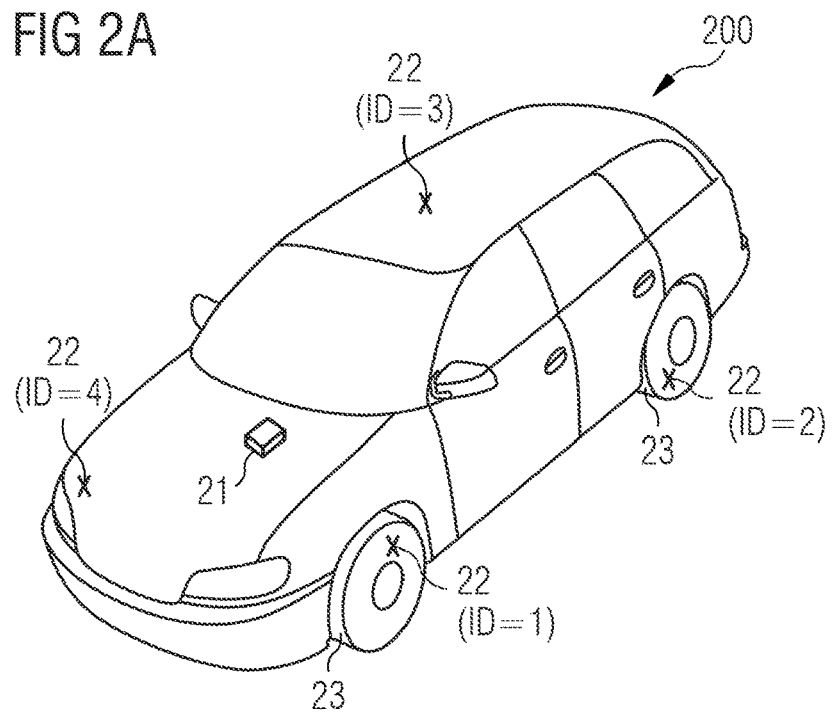

In the following, a plurality of details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field (e.g., the Earth's magnetic field), an electric field, a pressure, an acceleration, a temperature, a force, a current, or a voltage, but is not limited thereto. A sensor device, as described herein, may be an angle sensor, a linear position sensor, a speed sensor, motion sensor, a pressure sensor, acceleration sensor, temperature sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.) corresponding to detecting and/or measuring the magnetic field pattern of an element that generates the magnetic field (e.g., a magnet, a current-carrying conductor (e.g. a wire), the Earth, or other magnetic field source).

A sensor circuit may be referred to as a signal processing circuit and/or a signal conditioning circuit that receives the signal (i.e., sensor signal) from the pressure field sensor element in the form of raw measurement data. The sensor circuit may include an analog-to-digital converter (ADC) that converts the analog signal from the pressure sensor to a digital signal. The sensor circuit may also include a digital signal processor (DSP) that performs some processing on the digital signal (e.g., to prepare tire pressure information for transmission). Therefore, the sensor package comprises a circuit which conditions and amplifies the small signal of the pressure sensor via signal processing and/or conditioning.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

According to one or more embodiments, a pressure sensor and a sensor circuit are both accommodated (i.e., integrated) in the same chip package (e.g., a plastic encapsulated package, such as leaded package or leadless package, or a surface mounted device (SMD)-package). This chip package is also referred to as sensor package. The sensor package may be combined with other components to form a sensor module, sensor device, or the like.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

FIG. 1 illustrates a monolithic TPMS sensor module 100 according to one or more embodiments. The TPMS sensor module 100 is a direct TPMS sensor mounted inside a tire. A pressure sensor 11 can be incorporated as part of a typical semiconductor technology, and may be a microelectromechanical systems (MEMS) pressure sensor 11. Therefore, the pressure sensor 11 can enable the TPMS sensor 100, which includes the pressure sensor 11, a microcontroller unit (MCU) 12, and a transceiver 13, to aid in monitoring tire pressure. The pressure sensor 11 is electrically connected to the MCU 12 and configured to measure the internal air pressure of a tire. The TPMS sensor module 100 may also include an acceleration sensor 14 electrically connected to the MCU 12 and configured to detect and/or measure an acceleration of the tire (e.g., for detecting a motion of a vehicle). A power supply 15 (e.g., a battery cell) is further provided to supply power to the TPMS sensor 100 and its components.

The MCU 12 receives tire pressure information in the form of measurement values from the pressure sensor 11, and processes the information. The MCU 12 may store the tire pressure information and/or prepare the tire pressure information by the transceiver 13. The MCU 12 may further receive acceleration information from the acceleration sensor 14.

The transceiver 13 may be configured for bidirectional communication such that it both receives information (e.g., configuration information, control information, acknowledgement information) and transmits information (e.g., tire pressure information, acceleration information, etc.). For example, the transceiver 13 may be a Bluetooth transceiver that may use Bluetooth low energy (BLE) signals for communication. The transceiver 13 may be configured to communicate with a vehicle electronic control unit (ECU), a setting tool, a diagnostic and testing tool, a mobile device, or the like. A mobile device may be a cell phone.

The MCU 12, is configured to receive signals from one or more components of the TPMS sensor module 100 (e.g., sensor signals from the pressure sensor or the acceleration sensor), process the received signals and control the components via control signals. The MCU 12 may further include one or more memory devices or be electrically connected to one or more memory devices provided in the TPMS sensor module 100.

The transceiver 13 is electrically connected to the MCU 12 and is configured to transmit a signal to the vehicle ECU, the setting tool, the diagnostic and testing tool, or mobile device. The transceiver 13 may transmit a signal (e.g., data and/or feedback information) to the vehicle ECU, the setting tool, the diagnostic and testing tool, or the mobile device in response to the transceiver 13 receiving data in the form of information, acknowledgement, or a command from the vehicle ECU, the setting tool, the diagnostic and testing tool, or mobile device.

While not shown in FIG. 1, the TPMS sensor module 100 may further include a temperature sensor electrically connected to the MCU 12 and configured to measure the internal temperature of the tire, and a magnetic sensor electrically connected to the MCU 12 and configured to measure a magnetic field impinging thereon and generate magnetic field information. Thus, the MCU 12 may receive sensor information from any sensor provided in the TPMS sensor module 100.

While the TPMS sensor module 100 is illustrated as a monolithic device (i.e., single die integration), it will be understood that one or more components (e.g., the transceiver 13) may be provided on a separate die inside the integrated circuit package of the TPMS sensor module 100.

Figure 2B:
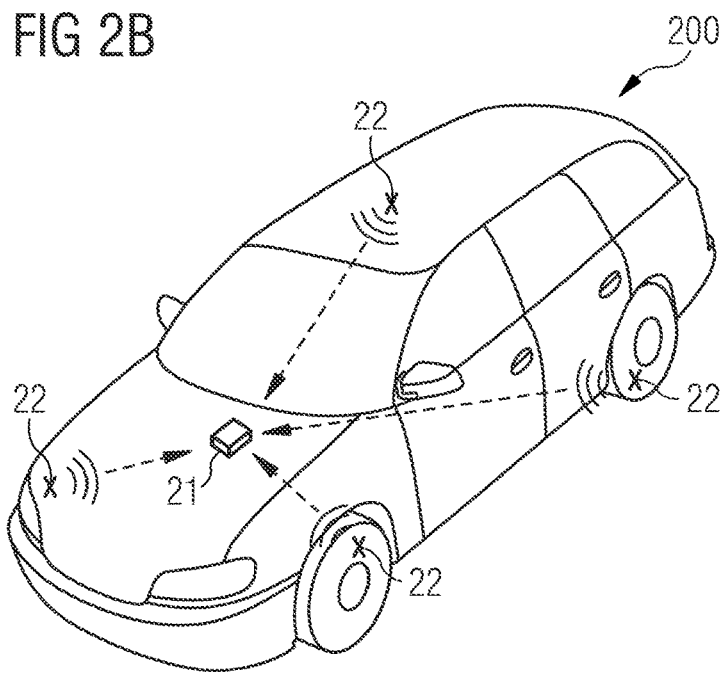

FIGS. 2A-2C illustrate a TPMS provided in a vehicle 200 according to one or more embodiments. As shown in FIG. 2A, the TPMS includes an ECU 21 and TPMS modules 22 provided inside each tire 23 of the vehicle 200. Each TPMS module 22 has a similar configuration described in FIG. 1. In addition, each TPMS module 22 may have an identifier (ID) that uniquely corresponds thereto. In this way the ECU 21 may be able to distinguish signals transmitted from various TPMS modules 22 and identify the TPMS module 22 from which a signal originates.

According to FIG. 2B, the TPMS modules 22 are configured to transmit signals (e.g., Bluetooth signals) to the ECU 21. Furthermore, as shown in FIG. 2C, the ECU 21, also configured with a (Bluetooth) transceiver, is configured to transmit signals (e.g., Bluetooth signals) to one or more of the TPMS modules 22.

Figure 3A:
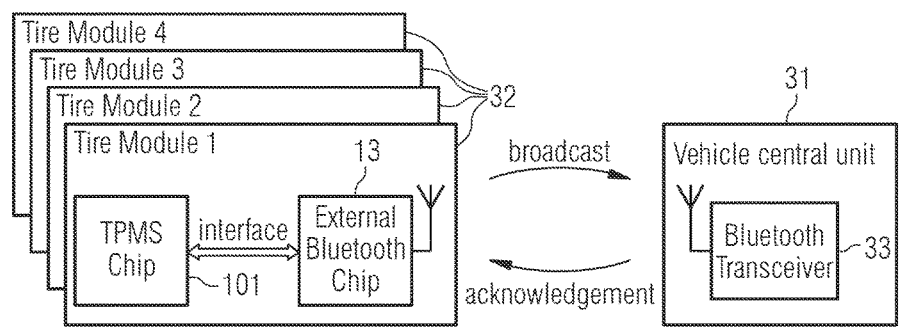
FIGS. 3A-3B illustrate a bidirectional communication link in a TPMS according to one or more embodiments.
Figure 3B:
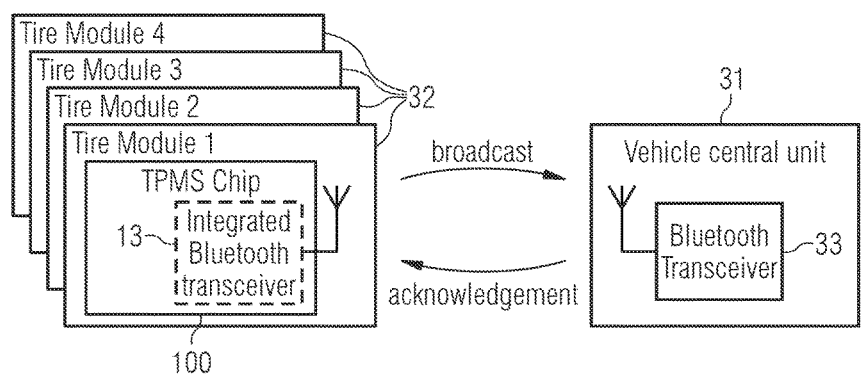

FIGS. 3A-3B illustrate a bidirectional communication link in a TPMS according to one or more embodiments. In particular, FIGS. 3A and 3B illustrate a vehicle control unit 31 in bidirectional communication with multiple TMPS modules 32 configured with corresponding IDs 1, 2, 3, and 4.

FIG. 3A shows that the vehicle control unit 31 includes a Bluetooth transceiver 33 configured to communicate with one or more of the TMPS modules 32. Similarly, each TMPS module 32 includes separate chips for the TPMS portion (i.e., sensing and signal processing) and the transceiver portion. Thus, each TMPS module 32 includes a TPMS chip 101 that is similar to the TPMS sensor module 100 shown in FIG. 1, with the exception of the transceiver 13. Instead, the transceiver 13 is located on a Bluetooth chip 13 external to the TPMS chip 101. The TPMS chip 101 and the Bluetooth chip 13 may be electrically connected together by an interface (e.g., Inter-Integrated Circuit (I²C) interface, or the like).

FIG. 3B shows a similar arrangement to that shown in FIG. 3A, with the exception that the TPMS portion (i.e., sensing and signal processing) and the transceiver portion are fully integrated on a single chip. Thus, the TPMS chip 100 is similar to the TMPS sensor module 100 shown in FIG. 1.

The Bluetooth standard has an operating mode, referred to as advertising mode, that when used in a modified manner according to the embodiments described herein may be used by a TPMS to acknowledge transmissions and help eliminate unnecessary redundant transmissions. By doing so, power consumption in the TPMS sensor module may be reduced.

In a normal usage of the advertising mode, a first unconnected Bluetooth device broadcasts a short message, and then listens for a short time period if a second Bluetooth device acknowledges the broadcast. The second device acknowledges the broadcast if it is willing to connect with the first device. Then a connection protocol is started. At the end of the connection protocol the two devices are considered paired.

According the embodiments herein, the advertising mode is used in a different way. While the TPMS sensor module 32 and the vehicle control unit 31 are configured in advertising mode, a TPMS sensor module 32 may obtain sensor information and may be prepared to transmit the sensor information in a broadcast message to the vehicle control unit 31. The broadcast message may contain a TPMS specific payload of up to 31 bytes. This payload can be used by the TPMS sensor module 32 to transmit the desired data like tire pressure and tire temperature. In response, the vehicle control unit 31 may be configured to reply with an acknowledgement (ACK). However, the TPMS sensor module 32 may not start a connection protocol but instead sets the Bluetooth transceiver 13 into standby mode instead. The Bluetooth transceiver 13 may be configured by the MCU 12 to remain in standby mode for a preset duration or until another broadcast is ready for transmission.

On the other hand, if no acknowledgment (ACK) is received by the TPMS sensor module 32 from the vehicle control unit 31, the TPMS sensor module 32 may determine that the broadcast was unsuccessful after expiration of a certain period of time, and attempt again. Thus, the TPMS sensor module 32 is configured to broadcast a redundant message and monitor for an acknowledgement. The TPMS sensor module 32 may be further configured to transmit the redundant message after each failed attempt up to a maximum number of repetitions. After each failed attempt, the TPMS sensor module 32 may transmit the redundant message immediately or impose a first delay period before the next broadcast attempt. After, reaching a maximum number of failed attempts, the TPMS sensor module 32 may enter standby mode for a second delay period that is longer than the first delay period. After the expiration of the second delay period, the TPMS sensor module 32 may initiate a new broadcast with potentially new or updated sensor information.

The TPMS module 32 may be configured with additional functionality and may be configured to transmit and/or receive other type of messages or modified messages.

For example, upon receiving an acknowledgement, the TMPS sensor module 32 may enter into a connected mode with a second device (e.g., the vehicle control unit 31 or mobile device). In connected mode, or once paired, continuous data transmissions may be transmitted from the TMPS sensor module 32 and/or the second device. This may be useful for TPMS in order to run a tire-filling App on a smart phone in which tire pressure information is continuously transmitted from the TMPS sensor module 32 to the smart phone to provide a tire pressure status for display on the smart phone. In order not to connect with any smart phone in the vicinity, a TPMS specific code provide in the acknowledgement for a connection request may be needed so that the TMPS sensor module 32 knows not to enter standby mode, but instead to override this setting and enter connected mode.

In another example, the vehicle control unit 31 may transmit a request for specific data in the acknowledgement message, and the TPMS module 32 may obtain and/or transmit the requested data prior to entering standby mode. The TPMS module 32 may also be configured to wait for an acknowledgement to the specific data prior to entering standby mode, or else transmit a redundant message for the specific data in a similar way described above. The specific data may be, for example, diagnosis data, reading of a mileage counter, etc. For example, the vehicle control unit 31 may request additional diagnosis data in case it determines broadcasted pressure values are not plausible.

In another example, the acknowledgement transmitted by a device to the TPMS sensor module 32 may include a unique identifier of the device. For example, the vehicle control unit 31 may include a unique vehicle identifier in its acknowledgement. The TPMS sensor module 32 may be configured to learn to recognize an identifier, and treat the corresponding device as a trusted device after receiving the same identifier a preset number of times. In this case, the vehicle control unit 31 may always writes a unique ID into the payload of the acknowledge message and the TPMS sensor module 32 can learn in this ID. This way it is possible for the TPMS sensor module 32 to determine whether the acknowledgement message is really from the right source.

In still another example, the acknowledgement transmitted by a device to the TPMS sensor module 32 may include a general TPMS identifier. Thus, instead of a unique vehicle ID, a general identifier for TPMS central units could be used. This would enable the TPMS sensor module 32 to at least recognize TPMS related devices and avoid interference with at least with non-TPMS devices.

FIG. 4 is a flow diagram of a method 400 implemented in a TPMS operating in a Bluetooth advertising mode according to one or more embodiments. A TPMS sensor module transmits data (operation 405) and determines whether an ACK has been received during a waiting period (operation 410). If an ACK has not been received at the expiration of the waiting period (410—N), the TPMS sensor module returns to operation 405 to retransmit the data. If an ACK has been received prior to expiration of the waiting period (410—Y), the TPMS sensor module enters into standby mode (operation 415).

In view of the above, a TPMS sensor module may include a pressure sensor configured to measure an internal air pressure of a tire and generate tire pressure information; a microcontroller unit electrically connected to the pressure sensor; and a transceiver electrically connected to the microcontroller unit. The transceiver may be configured to transmit a message including the pressure information, and may be further configured to receive an acknowledgement in response to the transmitted message. Furthermore, on a condition that the transceiver receives the acknowledgement, the microcontroller unit is configured to set the transceiver into a standby mode, and, on a condition that the transceiver does not receive the acknowledgement, the microcontroller unit is configured to instruct the transceiver to transmit a redundant message that is redundant to the transmitted message, and the transceiver is configured to transmit the redundant message.

It is noted that the transceiver may be a Bluetooth transceiver, and the message and the acknowledgement are provided in Bluetooth transmissions. However, it will be appreciated that other types of transceivers may be used.

It is also noted that the Bluetooth transceiver may be configured to operate in a Bluetooth advertising mode for transmitting the message and receiving the acknowledgement. As a default setting, the microcontroller unit may be configured to set the transceiver into a standby mode for a predetermined time on the condition that the transceiver receives the acknowledgement. However, the TPMS sensor module may receive special commands in the acknowledgement to override entering into the standby mode and instead enter into another communication mode (e.g., connected mode).

Upon expiration of the predetermined time period, the microcontroller unit may be configured to enable the transceiver, and the transceiver may be configured to transmit an update message including an update to the tire pressure information, and further configured to receive another acknowledgement in response to the transmitted update message. On a condition that the transceiver receives the other acknowledgement, the microcontroller unit may be configured to again set the transceiver into the standby mode. On a condition that the transceiver does not receive the other acknowledgement, the microcontroller unit may be further configured to instruct the transceiver to transmit a redundant update message that is redundant to the transmitted update message, and the transceiver is configured to transmit the redundant update message.

In addition, the transceiver may be configured to transmit the redundant message up to a maximum number of times, and, on a condition the acknowledgment is not received in response to the redundant message transmitted up to the maximum number of times, the microcontroller unit is configured to disable the transceiver for a delay period.

As described above, the acknowledgement may include a request to enter a connected mode, and, on a condition that the acknowledgement includes the request to enter the connected mode, the microcontroller unit may be configured to override entering into the standby mode, and instruct the transceiver to enter the connected mode. The acknowledgement that includes the request to enter the connected mode may further include an identifier that corresponds (is exclusive) to the TPMS sensor module.

Alternatively or additionally, the acknowledgement may include a request for data, and, on a condition that the acknowledgement includes the request for data, the microcontroller unit is configured to override entering into the standby mode, and instruct the transceiver to transmit the data requested.

In addition, the acknowledgement may include an originator identifier corresponding to an originator of the acknowledgement (e.g., the vehicle control unit 31), and the microcontroller is configured to add the originator identifier to a trusted device list.

A system may include a TPMS sensor module including a first transceiver configured to transmit a message including tire pressure information; and a vehicle control unit including a second transceiver configured to receive the message, and further configured to transmit an acknowledgement in response to the received message. On a condition that the first transceiver receives the acknowledgement, the TPMS sensor module may be configured to set the first transceiver into a standby mode. On a condition that the first transceiver does not receive the acknowledgement, the TPMS sensor module may be configured to instruct the first transceiver to transmit a redundant message that is redundant to the transmitted message, and the first transceiver may be configured to transmit the redundant message to the vehicle control unit.

The first transceiver and the second transceiver may be Bluetooth transceivers configured to communicate with each other via Bluetooth transmissions. However, it will be appreciated that other types of transceivers may be used.

The first transceiver and the second transceiver may be configured to operate in a Bluetooth advertising mode for exchanging the message and the acknowledgement.

On the condition that the first transceiver receives the acknowledgement, the TPMS sensor module may be configured to set the first transceiver into the standby mode for a predetermined time period. Upon expiration of the predetermined time period, the TPMS sensor module may be configured to enable the first transceiver, and the first transceiver may be configured to transmit an update message including an update to the tire pressure information. The second transceiver may be configured to receive the update message, and may be further configured to transmit another acknowledgement in response to the received update message. On a condition that the first transceiver receives the other acknowledgement, the TPMS sensor module may be configured to set the first transceiver into the standby mode. On a condition that the first transceiver does not receive the other acknowledgement, the TPMS sensor module may be configured to instruct the first transceiver to transmit a redundant update message that is redundant to the transmitted update message, and the first transceiver is configured to transmit the redundant update message.

The first transceiver may be configured to transmit the redundant message up to a maximum number of times, and, on a condition the first transceiver does not receive the acknowledgment in response to the redundant message transmitted up to the maximum number of times, the TPMS sensor module may be configured to disable the first transceiver for a delay period.

The acknowledgement may include a request to enter a connected mode, and, on a condition that the acknowledgement includes the request to enter the connected mode, the TPMS sensor module may be configured to override entering into the standby mode, and enter into the connected mode with the vehicle control unit.

The acknowledgement including a request to enter the connected mode may further include an identifier that corresponds (is exclusive) to the TPMS sensor module.

Additionally or alternatively, the acknowledgement may include a request for data, and, on a condition that the acknowledgement includes the request for data, the TPMS sensor module may be configured to override entering into the standby mode, and instruct the first transceiver to transmit the data requested to the vehicle control unit.

In addition, the acknowledgement may include an identifier of the vehicle control unit, and the microcontroller may be configured to add the identifier of the vehicle control unit to a trusted device list.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods, and vice versa where a function or sting of functions described in context of implemented one or more devices may be performed as a method.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same device or within separate devices to support the various techniques described in this disclosure.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A tire pressure monitoring system (TPMS) sensor module, comprising:
    a pressure sensor configured to measure an internal air pressure of a tire and generate tire pressure information;
    a microcontroller unit electrically connected to the pressure sensor; and
    a transceiver electrically connected to the microcontroller unit, the transceiver configured to transmit a message including the pressure information, further configured to receive an acknowledgement in response to the transmitted message,
    wherein, on a condition that the transceiver receives the acknowledgement, the microcontroller unit is configured to set the transceiver into a standby mode, and
    wherein, on a condition that the transceiver does not receive the acknowledgement, the microcontroller unit is configured to instruct the transceiver to transmit a redundant message that is redundant to the transmitted message, and the transceiver is configured to transmit the redundant message.

2. The TPMS sensor module of claim 1, wherein the transceiver is a Bluetooth transceiver, and the message and the acknowledgement are provided in Bluetooth transmissions.

3. The TPMS sensor module of claim 2, wherein the Bluetooth transceiver configured to operate in a Bluetooth advertising mode for transmitting the message and receiving the acknowledgement.

4. The TPMS sensor module of claim 1, wherein on the condition that the transceiver receives the acknowledgement, the microcontroller unit is configured to set the transceiver into the standby mode for a predetermined time period.

5. The TPMS sensor module of claim 4, wherein:
upon expiration of the predetermined time period, the microcontroller unit is configured to enable the transceiver, and
the transceiver is configured to transmit an update message including an update to the tire pressure information, and further configured to receive another acknowledgement in response to the transmitted update message,
wherein, on a condition that the transceiver receives the other acknowledgement, the microcontroller unit is configured to set the transceiver into the standby mode, and
wherein, on a condition that the transceiver does not receive the other acknowledgement, the microcontroller unit is configured to instruct the transceiver to transmit a redundant update message that is redundant to the transmitted update message, and the transceiver is configured to transmit the redundant update message.

6. The TPMS sensor module of claim 1, wherein:
the transceiver is configured to transmit the redundant message up to a maximum number of times, and
on a condition the acknowledgment is not received in response to the redundant message transmitted up to the maximum number of times, the microcontroller unit is configured to disable the transceiver for a delay period.

7. The TPMS sensor module of claim 1, wherein:
the acknowledgement includes a request to enter a connected mode, and
on a condition that the acknowledgement includes the request to enter the connected mode, the microcontroller unit is configured to override entering into the standby mode, and instruct the transceiver to enter the connected mode.

8. The TPMS sensor module of claim 7, wherein the acknowledgement that includes the request to enter the connected mode further includes an identifier that is exclusive to the TPMS sensor module.

9. The TPMS sensor module of claim 1, wherein:
the acknowledgement includes a request for data, and
on a condition that the acknowledgement includes the request for data, the microcontroller unit is configured to override entering into the standby mode, and instruct the transceiver to transmit the data requested.

10. The TPMS sensor module of claim 1, wherein:
the acknowledgement includes an originator identifier corresponding to an originator of the acknowledgement, and
the microcontroller is configured to add the originator identifier to a trusted device list.

11. A tire pressure monitoring system (TPMS), comprising:
a TPMS sensor module including a first transceiver configured to transmit a message including tire pressure information;
a vehicle control unit including a second transceiver configured to receive the message, and further configured to transmit an acknowledgement in response to the received message,
wherein, on a condition that the first transceiver receives the acknowledgement, the TPMS sensor module is configured to set the first transceiver into a standby mode, and
wherein, on a condition that the first transceiver does not receive the acknowledgement, the TPMS sensor module is configured to instruct the first transceiver to transmit a redundant message that is redundant to the transmitted message, and the first transceiver is configured to transmit the redundant message to the vehicle control unit.

12. The TPMS of claim 11, wherein the first transceiver and the second transceiver are a Bluetooth transceivers configured to communicate with each other via Bluetooth transmissions.

13. The TPMS of claim 12, wherein the first transceiver and the second transceiver are configured to operate in a Bluetooth advertising mode for exchanging the message and the acknowledgement.

14. The TPMS of claim 11, wherein on the condition that the first transceiver receives the acknowledgement, the TPMS sensor module is configured to set the first transceiver into the standby mode for a predetermined time period.

15. The TPMS of claim 14, wherein:
upon expiration of the predetermined time period, the TPMS sensor module is configured to enable the first transceiver, and the first transceiver is configured to transmit an update message including an update to the tire pressure information, and
the second transceiver is configured to receive the update message, and further configured to transmit another acknowledgement in response to the received update message,
wherein, on a condition that the first transceiver receives the other acknowledgement, the TPMS sensor module is configured to set the first transceiver into the standby mode, and
wherein, on a condition that the first transceiver does not receive the other acknowledgement, the TPMS sensor module is configured to instruct the first transceiver to transmit a redundant update message that is redundant to the transmitted update message, and the first transceiver is configured to transmit the redundant update message.

16. The TPMS of claim 11, wherein:
the first transceiver is configured to transmit the redundant message up to a maximum number of times, and
on a condition the first transceiver does not receive the acknowledgment in response to the redundant message transmitted up to the maximum number of times, the TPMS sensor module is configured to disable the first transceiver for a delay period.

17. The TPMS of claim 11, wherein:
the acknowledgement includes a request to enter a connected mode, and
on a condition that the acknowledgement includes the request to enter the connected mode, the TPMS sensor module is configured to override entering into the standby mode, and enter into the connected mode with the vehicle control unit.

18. The TPMS of claim 17, wherein the acknowledgement that includes the request to enter the connected mode further includes an identifier that is exclusive to the TPMS sensor module.

19. The TPMS of claim 11, wherein:
the acknowledgement includes a request for data, and
on a condition that the acknowledgement includes the request for data, the TPMS sensor module is configured to override entering into the standby mode, and instruct the first transceiver to transmit the data requested to the vehicle control unit.

20. The TPMS of claim 11, wherein:
the acknowledgement includes an identifier of the vehicle control unit, and
the microcontroller is configured to add the identifier of the vehicle control unit to a trusted device list.

* * * * *